D. WHITMAN.
FIREPLACE COOKER.
APPLICATION FILED MAR. 4, 1916.

1,188,869.

Patented June 27, 1916.
2 SHEETS—SHEET 1.

Inventor
Davis Whitman.
By Victor J. Evans
Attorney

Witnesses

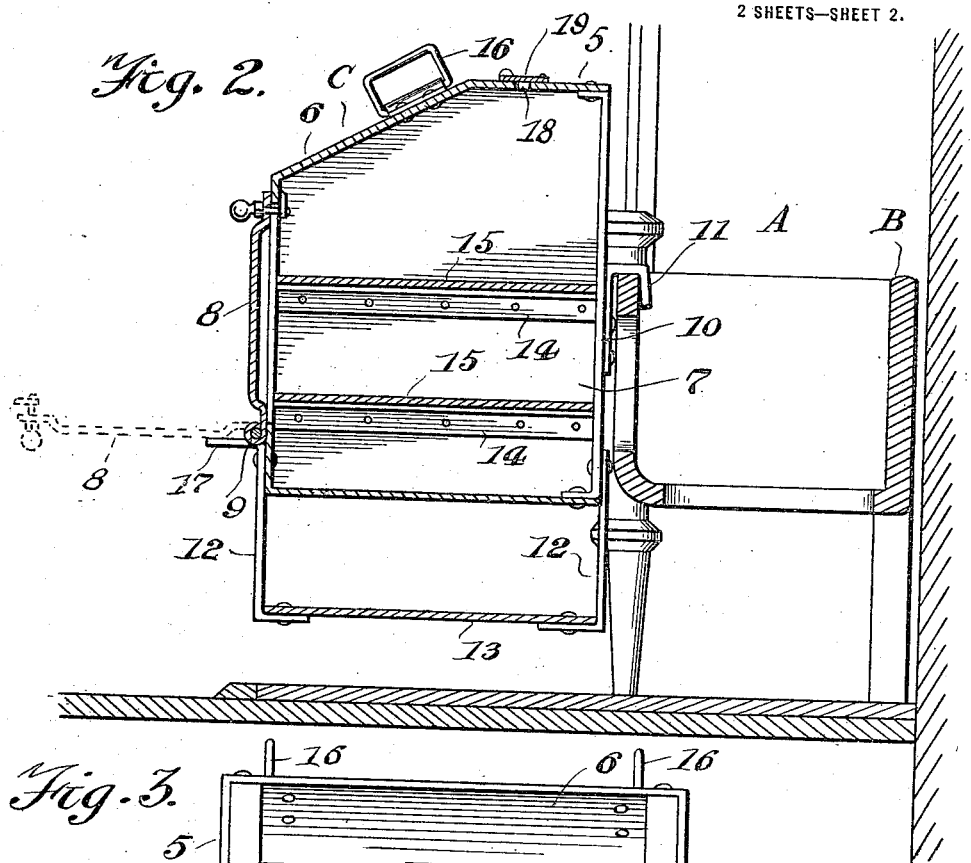
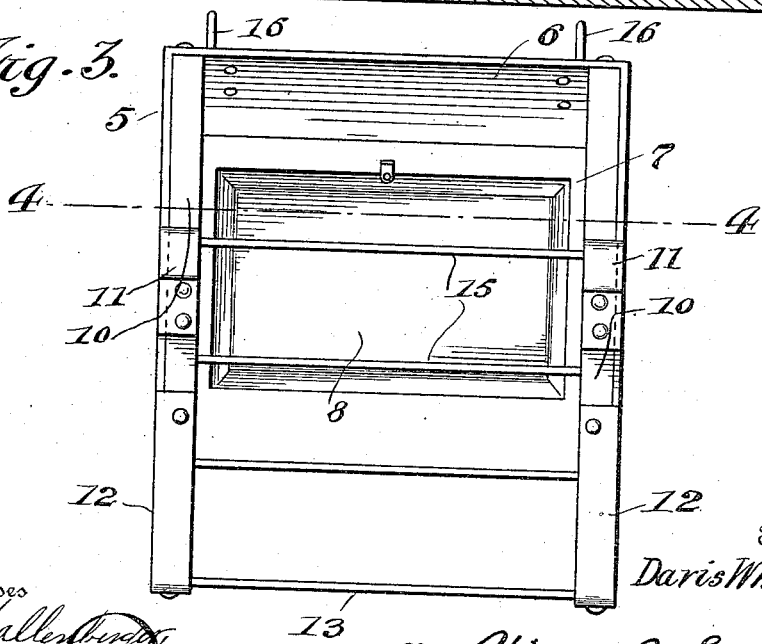

UNITED STATES PATENT OFFICE.

DAVIS WHITMAN, OF SPARTANBURG, SOUTH CAROLINA.

FIREPLACE-COOKER.

1,188,869.  Specification of Letters Patent.  Patented June 27, 1916.

Application filed March 4, 1916. Serial No. 82,208.

*To all whom it may concern:*

Be it known that I, DAVIS WHITMAN, a citizen of the United States, residing at Spartanburg, in the county of Spartanburg and State of South Carolina, have invented new and useful Improvements in Fireplace-Cookers, of which the following is a specification.

The invention relates to a fire place cooker, and more particularly to the class of portable ovens for fire places.

The primary object of the invention is the provision of a device of this character wherein the construction thereof permits the same to be attached to the front of a fire place grate basket so that the cooking of the contents thereof can be effected from the fire within the basket.

Another object of the invention is the provision of a device of this character wherein the construction thereof is novel in form to permit the cooking process to be carried forth in an economical and simple way.

A further object of the invention is the provision of an oven of this character wherein the same can be attached to or removed from the grate with despatch and is made to fit on a grate basket to be used within a fire place.

A still further object of the invention is the provision of a device of this character which is simple in construction, thoroughly reliable and efficient in use, strong, durable and inexpensive in manufacture.

Other objects of the invention will be in part obvious and in part hereinafter set forth.

The invention accordingly consists in the features of construction, combination of elements and arrangement of parts which will be exemplified in the construction hereinafter described, and the scope of the application of which will be indicated in the appended claim.

Figure 1:
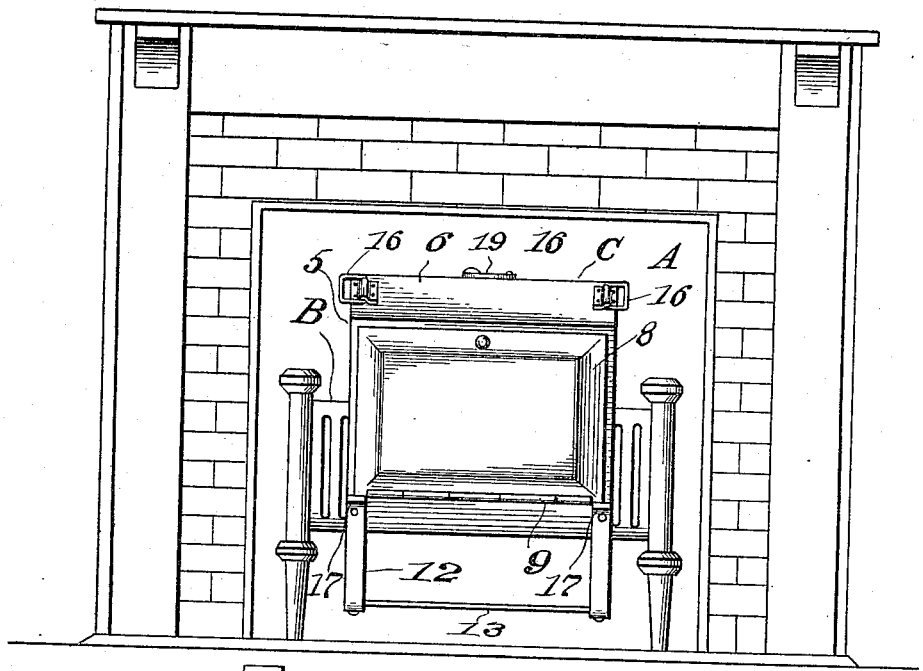
Figure 4:
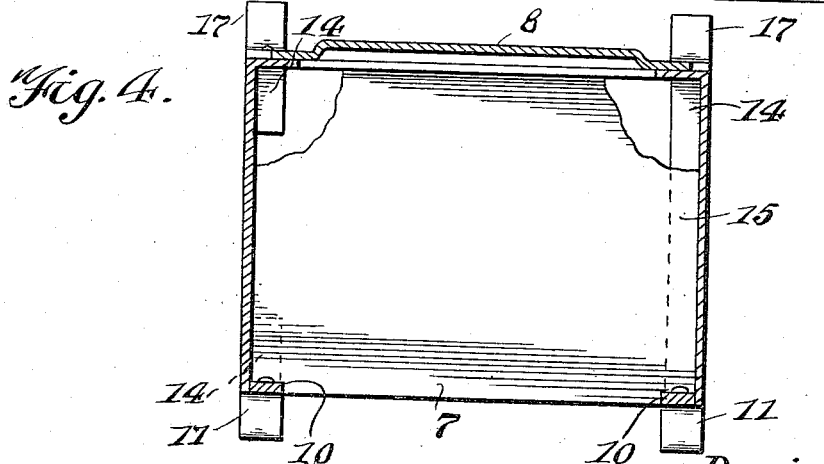

In the accompanying drawings: Figure 1 is a front elevation of a fire place showing a grate basket therein and the oven constructed in accordance with the invention mounted upon the latter; Fig. 2 is a vertical sectional view through the fire place; Fig. 3 is a rear elevation of the oven; Fig. 4 is a sectional view on the line 4—4 of Fig. 3.

Similar reference characters indicate corresponding parts throughout the several views of the drawings.

Referring to the drawings in detail, A designates the fire place, B the grate basket arranged therein which is of the ordinary well known construction and upon the front of which is hung the portable cooker or oven C hereinafter fully described.

The oven comprises a box-like body 5 preferably made from sheet metal formed with a sloping top 6 and having an open back 7 so that the heat from the fuel in the grate basket B will enter the oven for the cooking of the contents thereof.

At the front of the body 5 is a door 8 which is swingingly connected to the body through the medium of hinges 9 and permits access to be had to the interior of the said body through the doorway closed by the door. Secured to the top and bottom of the body 5 at opposite ends of the open back thereof are strap irons 10 to which are fixed hooks 11 so that the oven can be detachably hung on the front of the grate basket B, as shown.

Fixed to the body 5 of the oven or cooker and depending therefrom are hangers 12 which support a shelf 13, the latter serving as a support for food substances to be warmed exteriorly of the oven. Arranged within the body 5 on opposite ends thereof are shelf supports 14 on which are mounted shelves 15 for supporting food substances to be cooked interiorly of the oven. The front hangers 12 at their upper end are bent outwardly to provide supports 17 for the door 8 when the same is swung to open position so that the said door when in this position will serve as a shelf.

Swingingly mounted upon the sloping top 6 of the body 5 at a suitable point thereof are loop handles 16 which permit the convenient carrying of the oven and the placing of the same upon the basket B or its removal therefrom.

From the foregoing description, taken in connection with the accompanying drawings, the construction and manner of use of my cooker will be readily apparent and, therefore, a more extended explanation has been omitted.

Having thus described my invention, I claim:

A portable oven comprising a body open at the back thereof and having a doorway in its front and a vent hole in its top, a closure swingingly mounted upon the top for closing the vent hole, a door swingingly mounted on the front for closing the doorway, front and rear hangers fixed to the body, the front hangers having forwardly extending portions serving as a rest for the door when open, a shelf supported by the hangers beneath the body and means on the back of the body for detachably suspending said body upon a fire grate.

In testimony whereof I affix my signature in presence of two witnesses.

DAVIS WHITMAN.

Witnesses:
T. V. NELSON,
J. W. BECKNELL.